US012285951B2

(12) United States Patent
Sato et al.

(10) Patent No.: US 12,285,951 B2
(45) Date of Patent: Apr. 29, 2025

(54) SUPPLY UNIT, LIQUID DISCHARGE DEVICE, AND LIQUID CONTAINER

(71) Applicant: SEIKO EPSON CORPORATION, Tokyo (JP)

(72) Inventors: Seiya Sato, Matsumoto (JP); Seiji Tojo, Shiojiri (JP); Akihiko Maruyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 199 days.

(21) Appl. No.: 18/302,054

(22) Filed: Apr. 18, 2023

(65) Prior Publication Data

US 2023/0339233 A1 Oct. 26, 2023

(30) Foreign Application Priority Data

Apr. 20, 2022 (JP) ................................ 2022-069278

(51) Int. Cl.
*B41J 2/175* (2006.01)

(52) U.S. Cl.
CPC ................................ *B41J 2/17523* (2013.01)

(58) Field of Classification Search
CPC .... B41J 2/175; B41J 2/17503; B41J 2/17506; B41J 2/17509; B41J 2/17513; B41J 2/1752; B41J 2/17523; B41J 2/1753; B41J 2/17553; B41J 2/17556
See application file for complete search history.

(56) References Cited

U.S. PATENT DOCUMENTS

| | | | | |
|---|---|---|---|---|
| 6,729,714 | B2 * | 5/2004 | Sturgeon ................ | B41J 2/1755 347/49 |
| 8,596,771 | B2 | 12/2013 | Takagi et al. | |
| 9,278,540 | B2 | 3/2016 | Seki et al. | |
| 2003/0025762 | A1 | 2/2003 | Sturgeon et al. | |
| 2015/0375515 | A1 | 12/2015 | Seki et al. | |
| 2016/0200113 | A1 | 7/2016 | Nanjo et al. | |
| 2017/0341395 | A1 * | 11/2017 | Toya .................... | B41J 2/17513 |

FOREIGN PATENT DOCUMENTS

| | | |
|---|---|---|
| EP | 2397336 | 12/2011 |
| JP | 2012-071585 A | 4/2012 |
| JP | 2016-010888 A | 1/2016 |

* cited by examiner

*Primary Examiner* — Anh T Vo
(74) *Attorney, Agent, or Firm* — WORKMAN NYDEGGER

(57) ABSTRACT

A supply unit in which a liquid container including a coupling portion is detachably mounted includes a liquid introducing portion to which the coupling portion of the liquid container is coupled, a pressing member configured to press the liquid container in an uncoupling direction, which is a direction opposite to a coupling direction, when a direction in which the liquid container is coupled to the liquid introducing portion is defined as the coupling direction, an engaging portion configured to engage with the liquid container when the liquid container is coupled to the liquid introducing portion, and a speed reduction portion configured to reduce, when engagement of the engaging portion with the liquid container is released, a moving speed of the liquid container moving in the uncoupling direction.

8 Claims, 13 Drawing Sheets

SUPPLY UNIT, LIQUID DISCHARGE DEVICE, AND LIQUID CONTAINER

The present application is based on, and claims priority from JP Application Serial Number 2022-069278, filed Apr. 20, 2022, the disclosure of which is hereby incorporated by reference herein in its entirety.

BACKGROUND

1. Technical Field

The present disclosure relates to a supply unit, a liquid discharge device, and a liquid container.

2. Related Art

For example, as disclosed in JP-A-2016-10888, there is a liquid discharge device including a mounting portion, which is an example of a supply unit, and a recording head, which is an example of a liquid discharge head. The mounting portion includes an ink receiving tube, which is an example of a liquid introducing portion, a discharging spring, which is an example of a pressing member, and a locking lever, which is an example of an engaging portion.

An ink cartridge, which is an example of a liquid container, is removably mounted in the mounting portion. The ink cartridge mounted in the mounting portion is coupled to the ink receiving tube and locked by the locking lever. Ink, which is an example of a liquid, is supplied from the ink cartridge to the recording head via the ink receiving tube. The recording head performs recording on a recording medium by discharging the ink toward the recording medium.

The ink cartridge disclosed in JP-A-2016-10888 receives a force in a removing direction by the discharging spring. For that reason, when locking provided by the locking lever is released, the ink cartridge may be suddenly uncoupled from the ink receiving tube, causing the ink to drip.

SUMMARY

A supply unit for solving the above problems is a supply unit in which a liquid container including a coupling portion is detachably mounted, the supply unit including a liquid introducing portion to which the coupling portion of the liquid container is coupled, a pressing member configured to press the liquid container in an uncoupling direction being a direction opposite to a coupling direction when a direction in which the liquid container is coupled to the liquid introducing portion is defined as the coupling direction, an engaging portion configured to engage with the liquid container when the liquid container is coupled to the liquid introducing portion, and a speed reduction portion configured to reduce, when engagement of the engaging portion with the liquid container is released, a moving speed of the liquid container moving in the uncoupling direction.

A liquid discharge device for solving the above problems includes a liquid discharge head configured to discharge a liquid, a supply flow path through which the liquid contained in a liquid container is supplied to the liquid discharge head, and the supply unit having the above configuration.

A liquid container for solving the above problems is a liquid container detachably mounted in a supply unit, the supply unit including a liquid introducing portion configured to introduce a liquid, a pressing member configured to generate a pressing force, an engaging portion, and a speed reduction portion, the liquid container including a coupling portion configured to be coupled to the liquid introducing portion, a pressure receiving portion configured to receive the pressing force of the pressing member in an uncoupling direction being a direction opposite to a coupling direction when a direction in which the liquid container is coupled to the liquid introducing portion is defined as the coupling direction, an engaged portion with which the engaging portion engages when the liquid container is coupled to the liquid introducing portion, and a receiving recessed portion configured to receive at least a part of the speed reduction portion, the speed reduction portion being configured to reduce a moving speed of the liquid container moving in the uncoupling direction.

DESCRIPTION OF EXEMPLARY EMBODIMENTS

Embodiments

Figure 1:
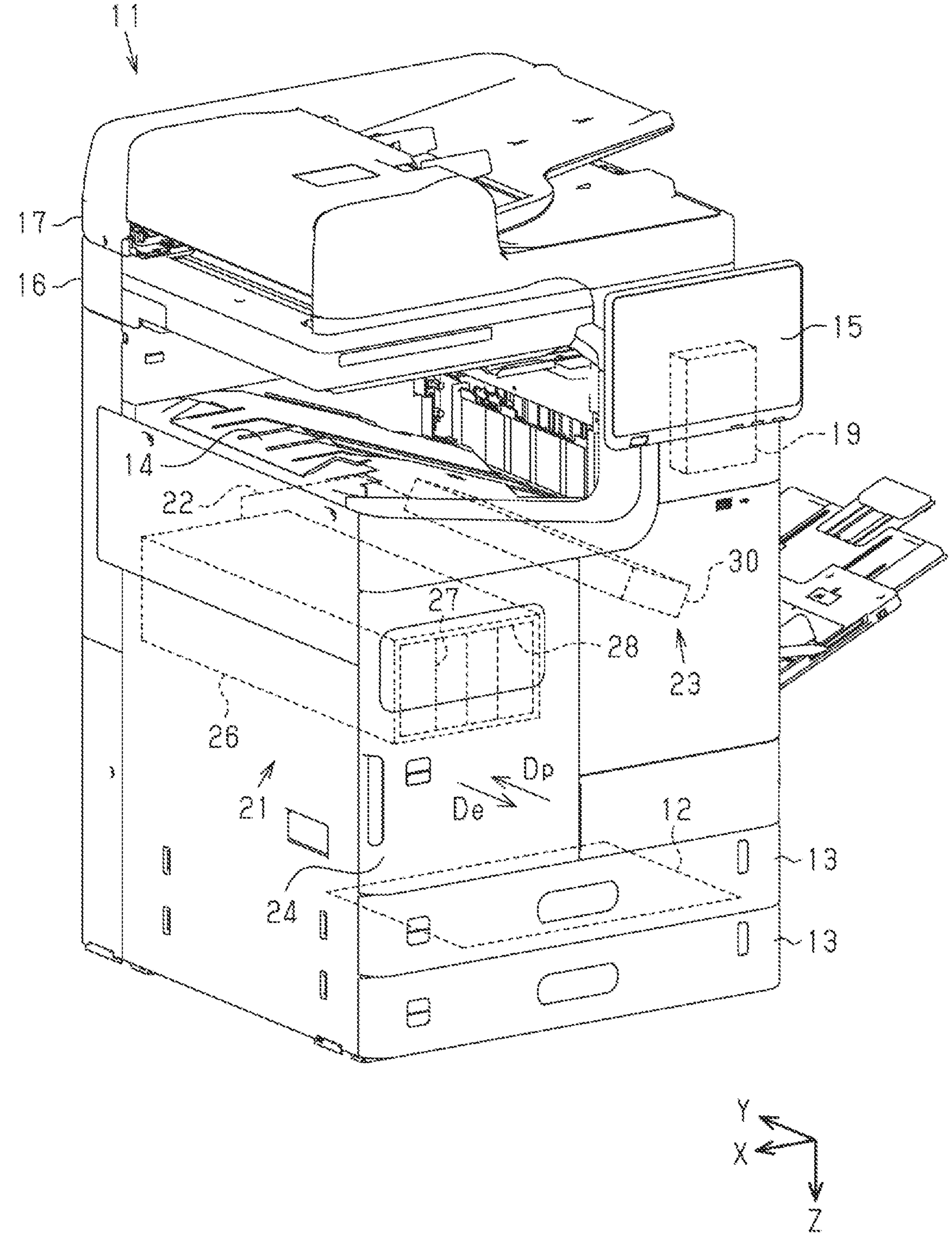
FIG. 1 is a perspective view of one embodiment of a liquid discharge device.

Embodiments of a supply unit, a liquid discharge device, and a liquid container will be described below with reference to the drawings. The liquid discharge device is, for example, an inkjet type printer that discharges ink, which is an example of a liquid, onto a medium such as paper, fabric, vinyl, a plastic component, or a metal component to perform printing on it.

In the drawings, a direction of gravity when a liquid discharge device 11 is assumed to be placed on a horizontal plane will be indicated by a Z axis, and directions along the horizontal plane will be indicated by an X axis and a Y axis. The X axis, the Y axis, and the Z axis are orthogonal to one another. When a user faces the front of the liquid discharge device 11, the Y axis indicates an inward direction of the liquid discharge device 11, and the X axis indicates a width direction of the liquid discharge device 11.

Liquid Discharge Device

As illustrated in FIG. 1, the liquid discharge device 11 may include one or more medium accommodating units 13 capable of accommodating media 12. The liquid discharge device 11 may include a stacker 14, an operation panel 15, an image reading unit 16, and an automatic feeding unit 17.

The medium accommodating unit 13 is, for example, a cassette. The medium accommodating unit 13 may accommodate a bundle of unprinted media 12. The stacker 14 receives printed media 12. The operation panel 15 is, for example, a touch panel for operating the liquid discharge device 11. The operation panel 15 may be provided to face the front of the liquid discharge device 11. The image reading unit 16 reads an image of a document. The automatic feeding unit 17 sends a document to the image reading unit 16. The image reading unit 16 and the automatic feeding unit 17 are disposed above the stacker 14, for example.

The liquid discharge device 11 includes a control unit 19 that controls various operations performed by the liquid discharge device 11.

The control unit 19 may be configured as a circuit including a: one or more processors that perform various processing in accordance with computer programs, one or more dedicated hardware circuits that perform at least some of the various processing, or y: a combination thereof. The hardware circuit is, for example, an application-specific integrated circuit. The processors include CPUs and memories such as a RAM and a ROM, and the memories store program codes or instructions that cause the CPUs to perform processing. Memories, that is, computer-readable media, include any readable media that can be accessed by general-purpose or dedicated computers.

The liquid discharge device 11 includes a supply unit 21, a supply flow path 22, and a liquid discharge head 23. The liquid discharge device 11 may include a cover 24.

The supply unit 21 may include a mounting portion 26. One or more liquid containers 27 are detachably mounted in the mounting portion 26. That is, the supply unit 21 is provided with the liquid containers 27 detachably mounted therein. In other words, the liquid containers 27 are detachably mounted in the supply unit 21.

Four liquid containers 27 can be mounted in the mounting portion 26 of the embodiment. The mounting portion 26 may include a plurality of slots corresponding to each of a plurality of liquid containers 27. The mounting portion 26 may include an insertion port 28 for inserting the liquid containers 27. The insertion port 28 opens toward, for example, the front of the liquid discharge device 11.

The liquid containers 27 of the embodiment are cartridges capable of containing a liquid. The liquid containers 27 are inserted into the mounting portion 26 by being moved in an inserting direction Dp from the insertion port 28 inwardly into the mounting portion 26. The liquid containers 27 are removed from the mounting portion 26 by being moved in an extracting direction De opposite to the inserting direction Dp. The inserting direction Dp and the extracting direction De of the embodiment are parallel to the Y axis.

The plurality of liquid containers 27 may contain different types of liquids. The different types of liquids are, for example, inks of different colors. In the embodiment, cyan, magenta, yellow, and black inks are stored in the four liquid containers 27.

The plurality of liquid containers 27 may have the same configuration or may have different configurations. For example, the plurality of liquid containers 27 may have different liquid storage capacity from each other. For example, the liquid storage capacity of the liquid container 27 that contains black ink may be larger than those of other liquid containers 27. A width of the liquid container 27 with a large capacity, that is, a length thereof along the X axis, may be longer than that of the liquid container 27 with a small capacity.

The cover 24 may be movable between a closed position illustrated in FIG. 1 and an open position (not illustrated). The cover 24 located at the closed position covers the insertion port 28. The cover 24 located at the open position opens the insertion port 28. An operator can individually replace the plurality of liquid containers 27 by positioning the cover 24 at the open position.

The supply flow path 22 couples the liquid containers 27 mounted in the supply unit 21 to the liquid discharge head 23. The supply flow path 22 supplies the liquids contained in the liquid containers 27 to the liquid discharge head 23. The liquid discharge device 11 may include a plurality of supply flow paths 22. The plurality of supply flow paths 22 may individually correspond to the plurality of liquid containers 27 mounted in the supply unit 21.

The liquid discharge head 23 discharges the liquids from one or more nozzles (not illustrated). The liquid discharge head 23 may be disposed in a posture in which a nozzle surface 30 on which the nozzle is open is inclined with respect to the horizontal. The liquid discharge head 23 performs printing by discharging liquid onto the medium 12. The liquid discharge head 23 may perform color printing by discharging ink of a plurality of colors. The liquid discharge head 23 of the embodiment is a line type provided over the width direction of the medium 12. The liquid discharge head 23 may be a serial type that performs printing while moving in the width direction of the medium 12.

Liquid Container

Figure 2:
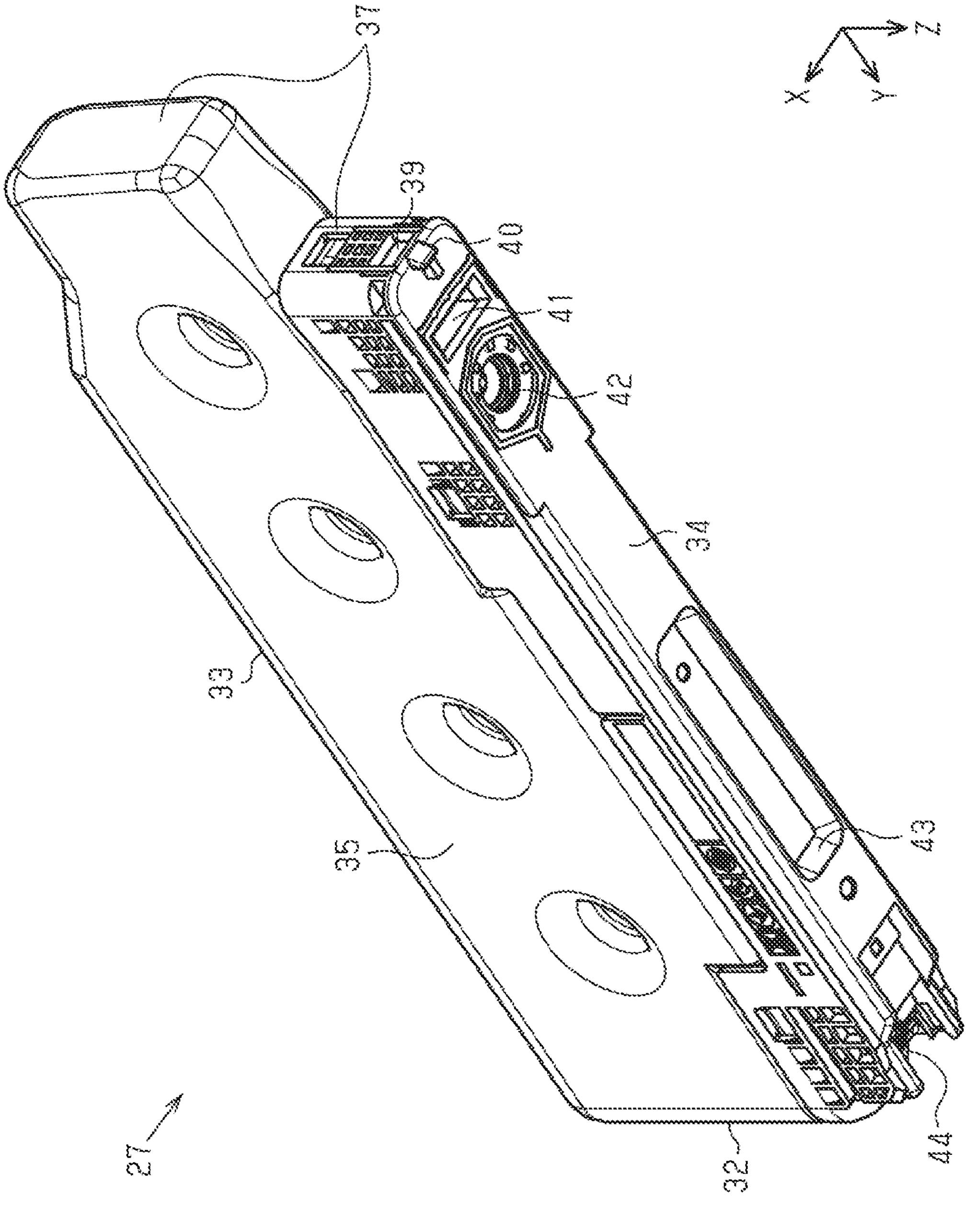
FIG. 2 is a perspective view of a liquid container mounted in the liquid discharge device.
Figure 3:
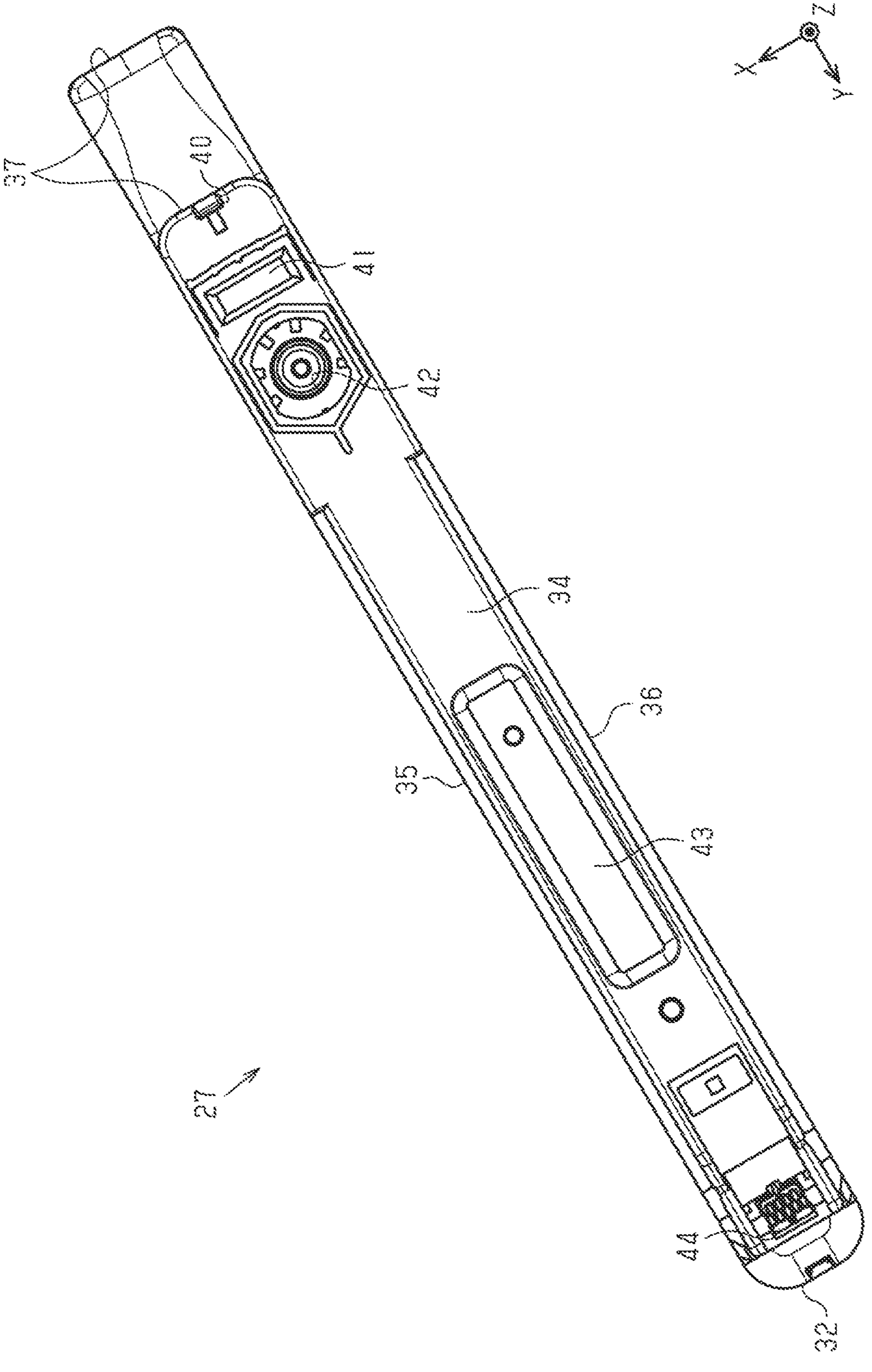
FIG. 3 is a bottom view of the liquid container mounted in the liquid discharge device.

FIGS. 2 and 3 illustrate the X axis, the Y axis, and the Z axis in a posture in which the liquid container 27 is inserted into the mounting portion 26.

As illustrated in FIGS. 2 and 3, the liquid container 27 may include, for example, a first end wall 32, an upper wall 33, a pressure receiving portion 34, a first side wall 35, a second side wall 36, and a second end wall 37. The pressure receiving portion 34 of the embodiment is also a bottom wall of the cartridge. The second end wall 37 may have a step. When the liquid container 27 is mounted in the liquid discharge device 11, the first end wall 32 is inserted first.

As illustrated in FIG. 2, the liquid container 27 may include an engaged portion 39, a release portion 40, a positioning hole 41, a coupling portion 42, a receiving recessed portion 43, and a circuit board 44.

The engaged portion 39 may be provided on the second end wall 37. The engaged portion 39 of the embodiment is a recessed portion that opens to the second end wall 37. The engaged portion 39 may be provided at a center of the second end wall 37 in the width direction. The engaged portion 39 may be provided on the release portion 40.

The release portion 40, the positioning hole 41, the coupling portion 42, the receiving recessed portion 43, and the circuit board 44 may be provided in the pressure receiving portion 34. The release portion 40, the positioning hole 41, the coupling portion 42, the receiving recessed portion 43, and the circuit board 44 may be arranged in order from the second end wall 37 toward the first end wall 32.

The release portion 40 may protrude downward from the pressure receiving portion 34. The positioning hole 41 and the receiving recessed portion 43 may be recessed portions that are open to the pressure receiving portion 34. The coupling portion 42 may open to the pressure receiving portion 34. The circuit board 44 may be provided in a portion obtained by cutting out a corner at which the pressure receiving portion 34 and the first end wall 32 intersect each other. The circuit board 44 may store information relating to the liquid container 27.

Figure 4:
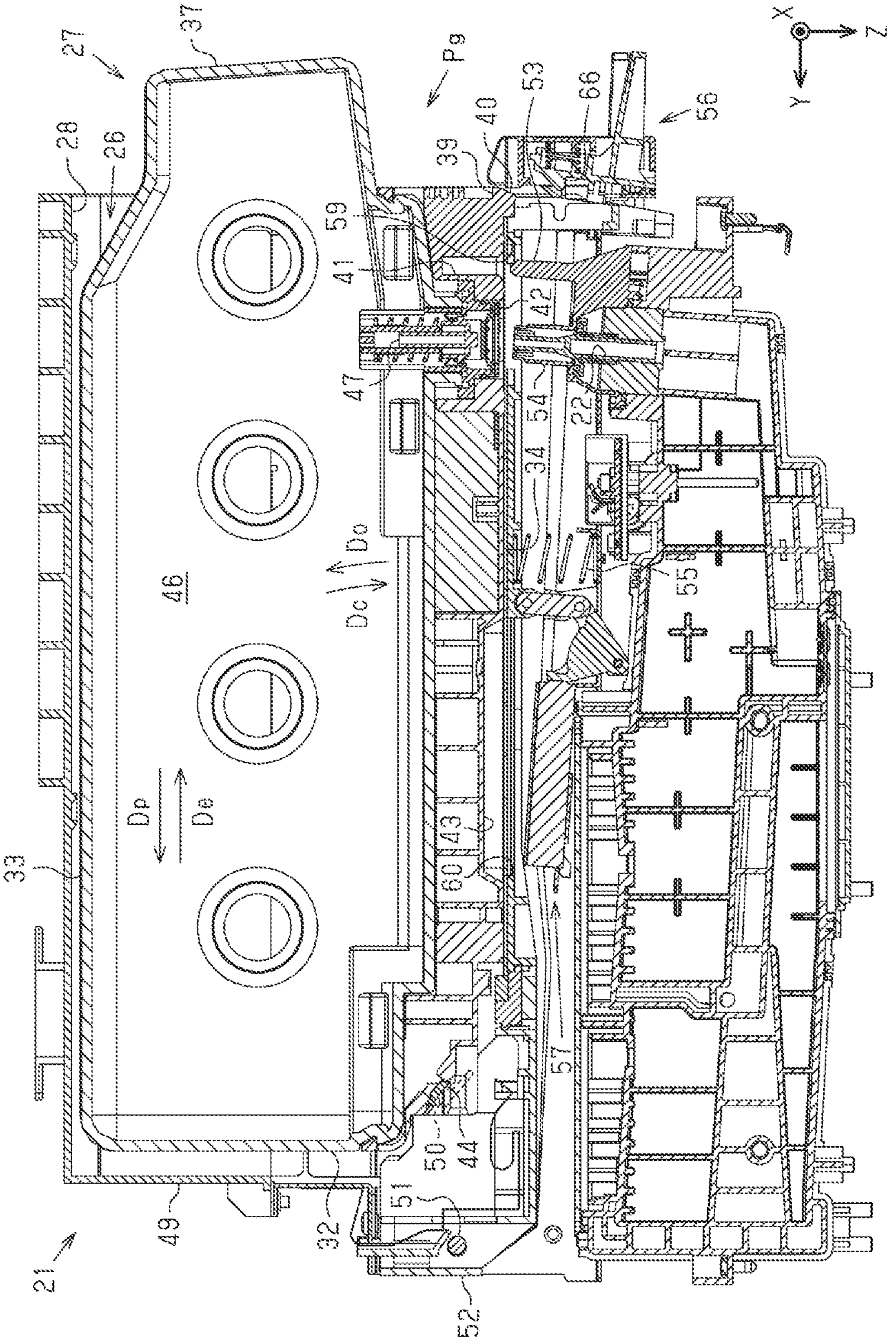
FIG. 4 is a cross-sectional view of a supply unit in which the liquid container is located at a guide position.

As illustrated in FIG. 4, the liquid container 27 may include a containing chamber 46 that contains liquid and a draw-out valve 47. The draw-out valve 47 may be provided in the coupling portion 42. The draw-out valve 47 opens the coupling portion 42, and thus the liquid stored in the containing chamber 46 is drawn out through the coupling portion 42. The draw-out valve 47 closes the coupling portion 42, and thus drawing-out of the liquid from the coupling portion 42 is restricted.

Supply Unit

As illustrated in FIG. 4, the supply unit 21 may include a box-shaped frame 49, an electrical coupling portion 50, a first shaft 51, and a support portion 52. The supply unit 21 may include a positioning protruding portion 53, a liquid introducing portion 54, a pressing member 55, an operation unit 56, and a speed reduction portion 57. The operation unit 56, the positioning protruding portion 53, the liquid introducing portion 54, the speed reduction portion 57, the electrical coupling portion 50, and the first shaft 51 may be arranged in order along the Y axis. The supply unit 21 may include a plurality of electrical coupling portions 50, first shafts 51, support portions 52, positioning protruding portions 53, liquid introducing portions 54, pressing members 55, operation units 56, and speed reduction portions 57.

The electrical coupling portion 50 and the first shaft 51 may be provided on an inner side of the frame 49, that is, at a position separated from the insertion port 28 in the inserting direction Dp. The electrical coupling portion 50 comes into contact with the circuit board 44 of the liquid container 27 mounted in the mounting portion 26. The electrical coupling portion 50 electrically couples the circuit board 44 to the control unit 19. The first shaft 51 may extend along the X axis. The first shaft 51 may support a plurality of support portions 52 to be rotatable individually.

Figure 5:
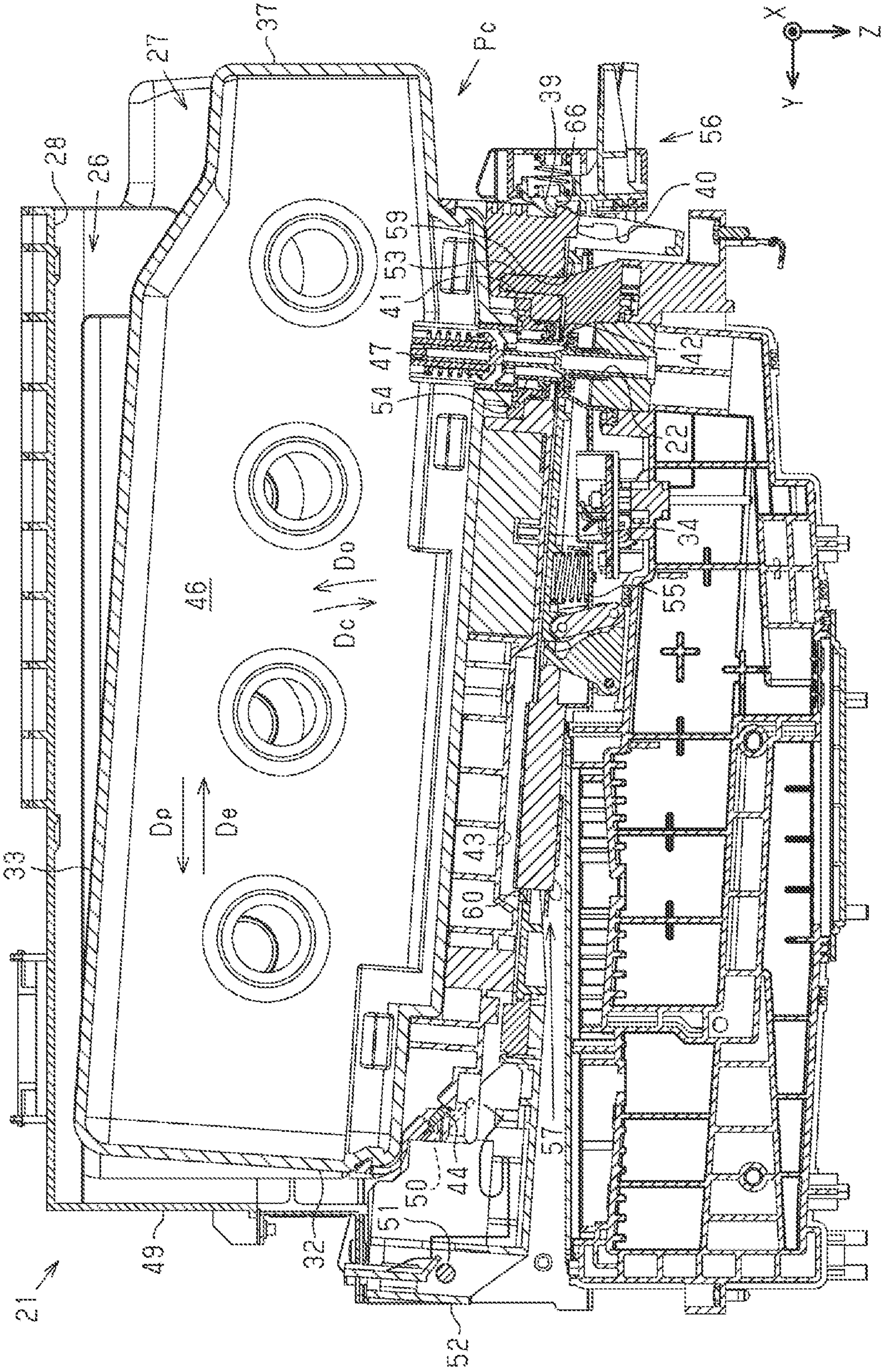
FIG. 5 is a cross-sectional view of the supply unit in which the liquid container is located at a coupling position.

The support portion 52 is movable between a guide position Pg illustrated in FIG. 4 and a coupling position Pc illustrated in FIG. 5 by rotating about the first shaft 51. The support portion 52 of the embodiment supports the liquid container 27 inserted from the insertion port 28. The liquid container 27 supported by the support portion 52 moves together with the support portion 52. In the embodiment, positions of the liquid container 27 that moves together with the support portion 52 are also referred to as the guide position Pg and the coupling position Pc, similarly to the positions of the support portion 52.

As illustrated in FIGS. 4 and 5, the guide position Pg of the support portion 52 is a position for guiding the liquid container 27 in the inserting direction Dp and the extracting direction De. The guide position Pg of the liquid container 27 is a position at which the liquid container 27 can move in the inserting direction Dp and the extracting direction De.

The coupling position Pc of the support portion 52 is a position at which the liquid container 27 is coupled to the liquid introducing portion 54. The coupling position Pc of the liquid container 27 is a position at which the coupling portion 42 is coupled to the liquid introducing portion 54 and is a position at which the liquid can be supplied to the liquid discharge device 11.

The support portion 52 located at the guide position Pg moves to the coupling position Pc by moving in the coupling direction Dc. That is, the coupling direction Dc is a direction in which the liquid container 27 is coupled to the liquid introducing portion 54. The support portion 52 located at the coupling position Pc moves to the guide position Pg by moving in the uncoupling direction Do, which is a direction opposite to the coupling direction Dc. That is, the uncoupling direction Do is a direction in which the coupling between the liquid container 27 and the liquid introducing portion 54 is released. The coupling direction Dc and the uncoupling direction Do of the embodiment are rotating directions around the first shaft 51.

The support portion 52 may include a first hole 59 and a second hole 60.

When the support portion 52 is located at the guide position Pg, the first hole 59 is located above the liquid introducing portion 54 and the positioning protruding portion 53. The first hole 59 allows the positioning hole 41 and the coupling portion 42 of the liquid container 27 located at the guide position Pg to face the positioning protruding portion 53 and the liquid introducing portion 54. The support portion 52 moving from the guide position Pg in the coupling direction Dc allows the liquid introducing portion 54 and the positioning protruding portion 53 to pass through the first hole 59.

When the support portion 52 is located at the guide position Pg, the second hole 60 is located above the speed reduction portion 57. The second hole 60 causes the receiving recessed portion 43 of the liquid container 27 located at the guide position Pg and the speed reduction portion 57 to face each other. The support portion 52 moving from the guide position Pg to the coupling position Pc allows the speed reduction portion 57 to pass through the second hole 60. When the support portion 52 is located at the coupling position Pc, the receiving recessed portion 43 receives at least a part of the speed reduction portion 57.

The positioning protruding portion 53 may protrude in the uncoupling direction Do. The positioning protruding portion 53 positions the liquid container 27 by engaging with the positioning hole 41 of the liquid container 27 located at the coupling position Pc. By providing the positioning protruding portion 53 near the liquid introducing portion 54, it is possible to improve positional accuracy of the liquid introducing portion 54 and the coupling portion 42. The positioning protruding portion 53 may extend substantially parallel to the liquid introducing portion 54.

The liquid introducing portion 54 can introduce the liquid drawn out from the liquid container 27. The liquid introducing portion 54 is provided at an upstream end of the supply flow path 22. The liquid introduced into the liquid introducing portion 54 is supplied to the liquid discharge head 23 via the supply flow path 22.

The liquid introducing portion 54 is coupled to the coupling portion 42 of the liquid container 27 located at the coupling position Pc. Specifically, the liquid introducing portion 54 may be inserted into the coupling portion 42 as the liquid container 27 moves in the coupling direction Dc and may open the draw-out valve 47.

The liquid introducing portion 54 may be disposed in a posture inclined with respect to the Y axis and the Z axis. For example, a center line of the liquid introducing portion 54 may form an angle in a range of more than 0° and at most 15° with respect to the Z axis. In the inserting direction Dp, a distance between the insertion port 28 and a tip of the liquid introducing portion 54 may be smaller than a distance between the insertion port 28 and a base end of the liquid introducing portion 54.

The inclination angle of the liquid introducing portion 54 may be set in accordance with the distance from the first shaft 51 and the length of the liquid introducing portion 54. By setting a linear distance between the tip of the liquid introducing portion 54 and the first shaft 51 to be substantially the same as a linear distance between the base end of the liquid introducing portion 54 and the first shaft 51, the liquid container 27 moving in the coupling direction Dc and the liquid introducing portion 54 can be smoothly coupled to each other.

The pressing member 55 presses the liquid container 27 in the uncoupling direction Do. Pressing is applying pressure to the liquid container 27 by pushing the liquid container 27 at rest. The pressing member 55 of the embodiment presses the liquid container 27 via the support portion 52. The pressing member 55 of the embodiment is a compression coil spring that applies pressure to the support portion 52 from below.

The pressing member 55 can generate a pressing force. The pressing force of the pressing member 55 is larger than a force required to move the support portion 52 and the liquid container 27, which needs to be replaced after the contained liquid has been drawn out, from the coupling position Pc to the guide position Pg. For that reason, in an initial state in which the liquid container 27 is not in the mounting portion 26, the support portion 52 is located at the guide position Pg. The pressing force of the pressing member 55 may be larger than a force required to move the support portion 52 and the liquid container 27, which is new before the liquid is drawn out, from the coupling position Pc to the guide position Pg.

Figure 6:
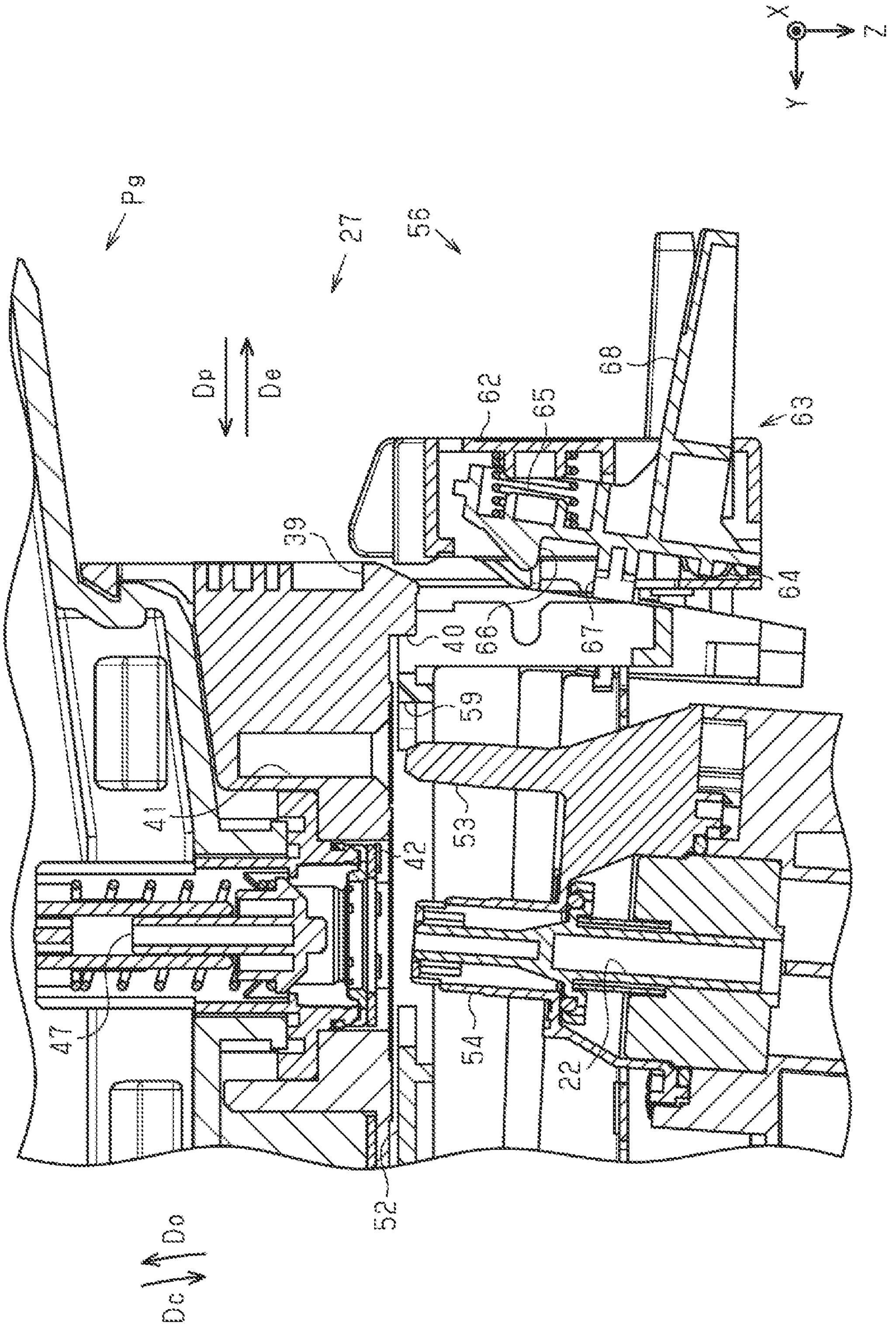
FIG. 6 is a partially enlarged view of the supply unit in FIG. 4.
Figure 7:
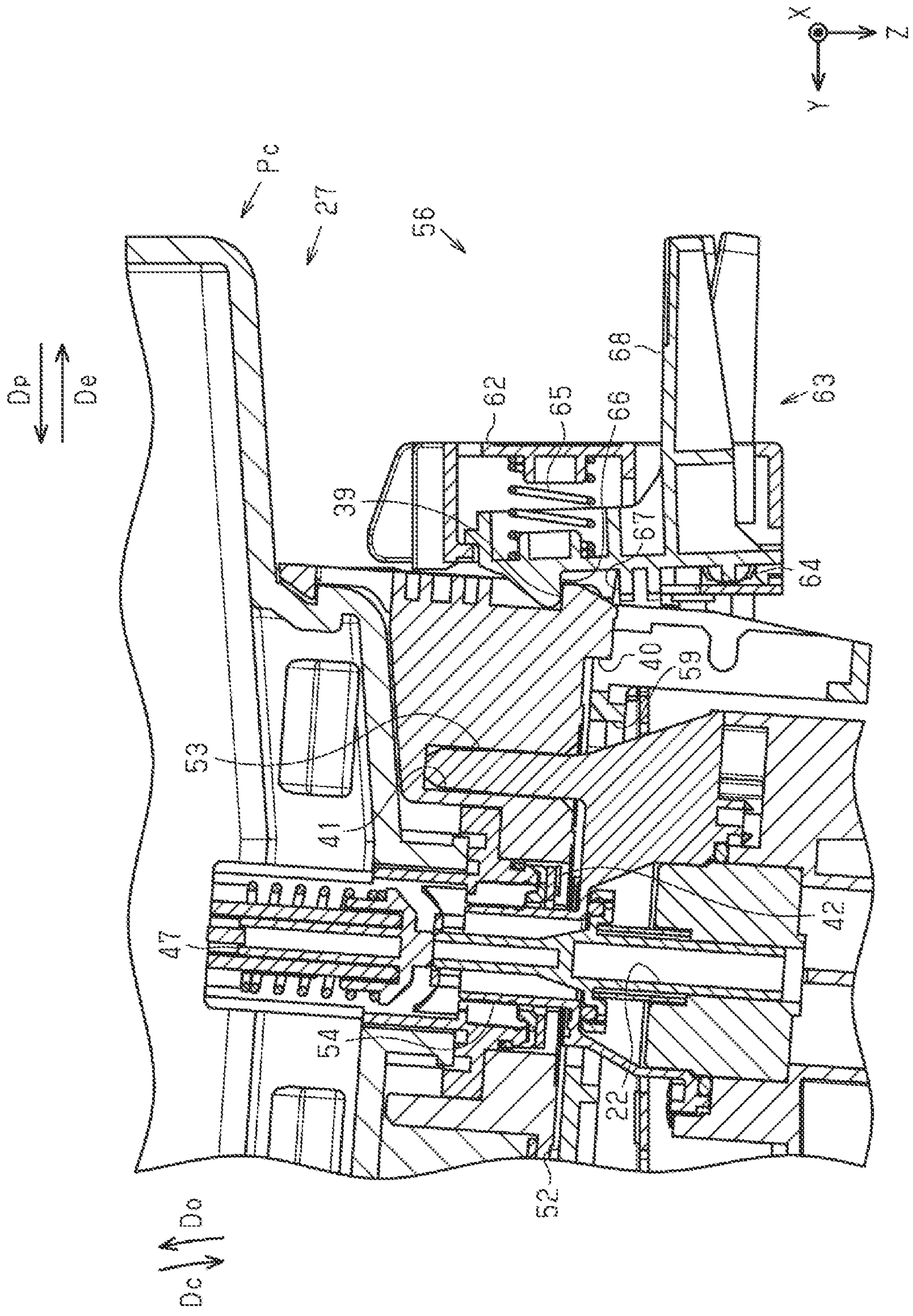
FIG. 7 is a partially enlarged view of the supply unit in FIG. 5.

As illustrated in FIGS. 6 and 7, the operation unit 56 may be disposed to face the tip of the support portion 52. The operation unit 56 may include a fixed portion 62, a movable portion 63, a second shaft 64, and a first spring 65. The movable portion 63 may include an engaging portion 66, a protrusion 67, and a lever 68. The fixed portion 62 may be fixed to the frame 49.

The movable portion 63 may rotate about the second shaft 64 to move between a release position illustrated in FIG. 6 and a lock position illustrated in FIG. 7. The second shaft 64 may extend along the X axis. The release position is a position at which engagement between the engaging portion 66 and the liquid container 27 is released. The lock position is a position at which the engaging portion 66 engages with the engaged portion 39.

The first spring 65 pushes the movable portion 63 so that the movable portion 63 is separated from the fixed portion 62. The first spring 65 pushes the movable portion 63 toward the lock position. The first spring 65 presses the engaging portion 66 and the protrusion 67 against the support portion 52 or the liquid container 27 in the inserting direction Dp.

The engaging portion 66, the protrusion 67, and the lever 68 may be integrally formed. The engaging portion 66 and the protrusion 67 may be provided above the second shaft 64 and the lever 68. In the movable portion 63 located at the lock position, while the engaging portion 66 and the protrusion 67 protrude toward the support portion 52 in the inserting direction Dp, the lever 68 protrudes in the extracting direction De. The operator moves the movable portion 63 to the release position by pushing down the lever 68 of the movable portion 63 located at the lock position.

As illustrated in FIG. 6, when the support portion 52 and the liquid container 27 are located at the guide position Pg, the movable portion 63 is located at the release position as a result of the protrusion 67 abutting the support portion 52. The protrusion 67 slides with respect to the support portion 52 moving in the coupling direction Dc. That is, the movable portion 63 allows the support portion 52 located at the guide position Pg and the liquid container 27 to move in the coupling direction Dc.

As illustrated in FIG. 7, when the support portion 52 and the liquid container 27 are located at the coupling position Pc, the movable portion 63 is located at the lock position, and the engaging portion 66 engages with the engaged portion 39. That is, the engaging portion 66 engages with the liquid container 27 when the liquid container 27 is coupled to the liquid introducing portion 54. In other words, the engaged portion 39 engages with the engaging portion 66 when the liquid container 27 is coupled to the liquid introducing portion 54.

The engaging portion 66 that engages with the engaged portion 39 restricts movement of the liquid container 27 located at the coupling position Pc in the uncoupling direction Do. Accordingly, the support portion 52 and the liquid container 27 are located at the coupling position Pc against the pressing force of the pressing member 55. By pushing down the lever 68, the engaging portion 66 is disengaged from the liquid container 27. When the engagement with the liquid container 27 by the engaging portion 66 is released, the support portion 52 and the liquid container 27 move in the uncoupling direction Do by being pressed by the pressing member 55.

Figure 8:
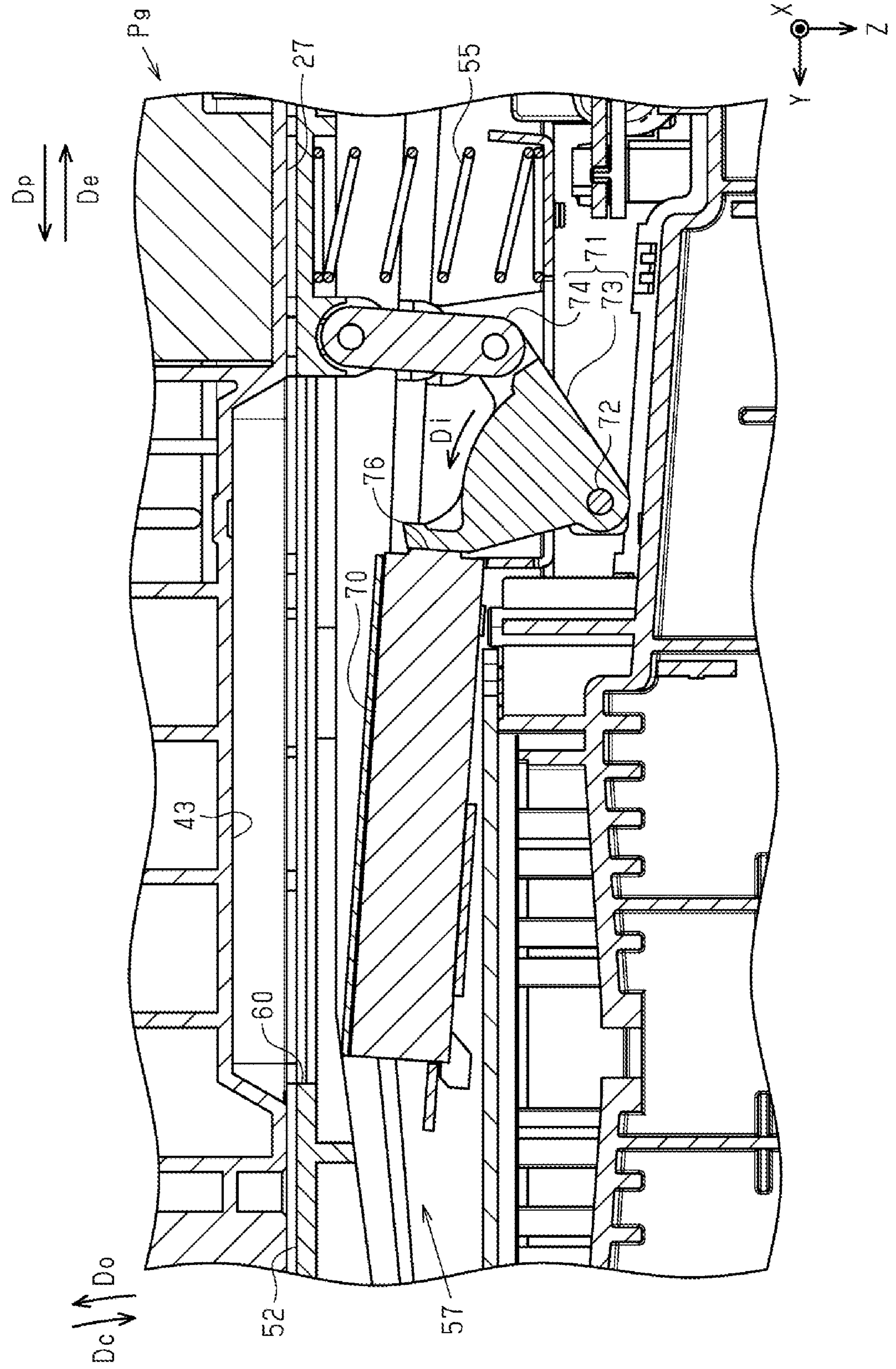
FIG. 8 is a partially enlarged view of the supply unit in FIG. 4.

As illustrated in FIG. 8, the speed reduction portion 57 reduces moving speeds of the support portion 52 and the liquid container 27 moving in the uncoupling direction Do. The speed reduction portion 57 of the embodiment reduces the moving speed of the liquid container 27 by reducing the moving speed of the support portion 52.

The speed reduction portion 57 may include an oil damper 70 and a moving unit 71. The moving unit 71 may include a rotating body 73 that rotates about a rotation shaft 72 and an arm 74.

At least a part of the moving unit 71 is movable in an intersecting direction Di intersecting the uncoupling direction Do in response to the movement of the support portion 52 in the uncoupling direction Do. The intersecting direction Di of the embodiment is a direction in which the rotating body 73 rotates about the rotation shaft 72. The rotation shaft 72 of the embodiment may extend along the X axis. In other words, the rotation shaft 72 extends in a direction intersecting the uncoupling direction Do and the intersecting direction Di.

Figure 9:
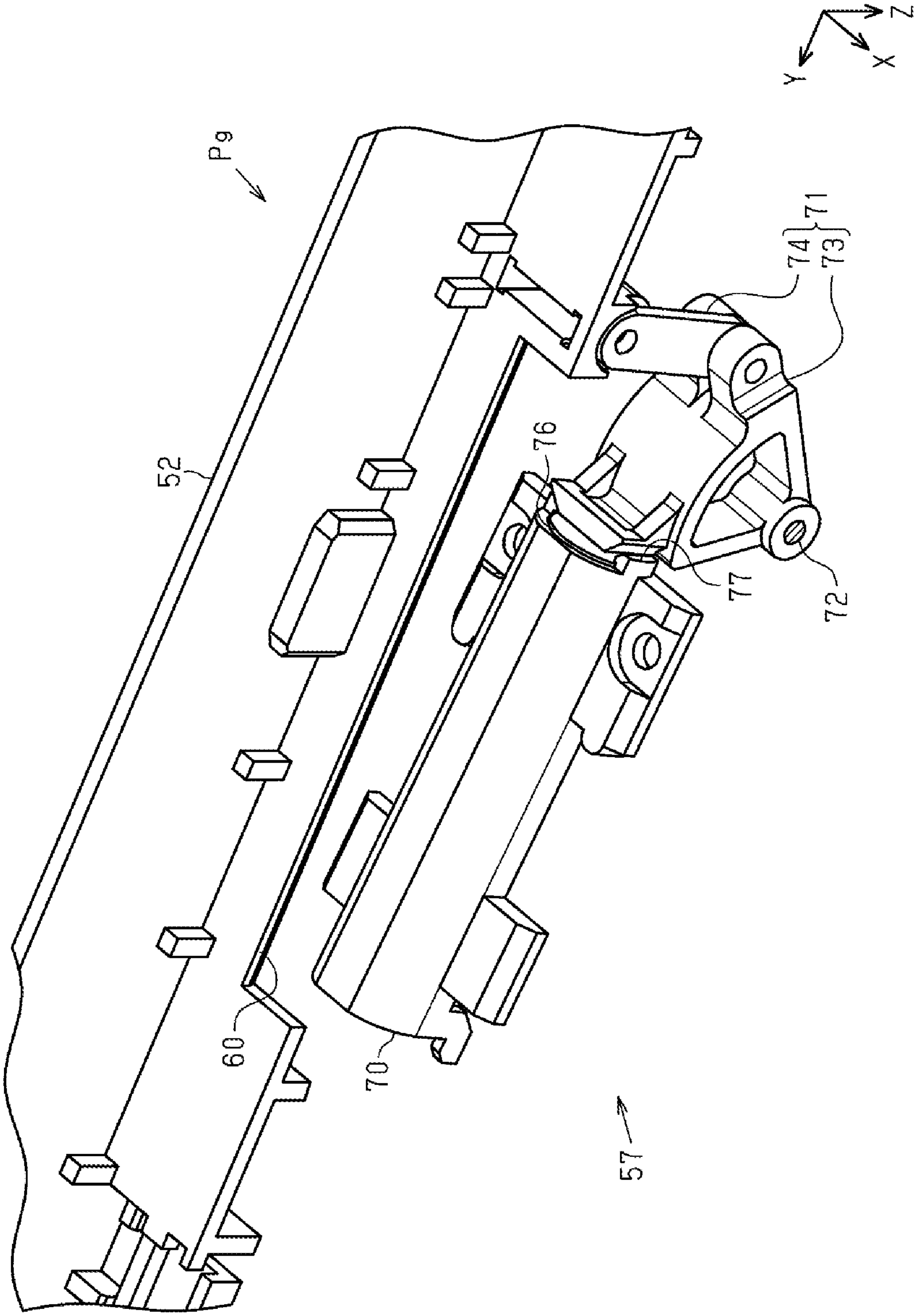
FIG. 9 is a perspective view of a speed reduction portion in FIG. 8.

As illustrated in FIG. 9, the oil damper 70 may include a piston 76 and a stopper 77. The oil damper 70 applies a load to a member that pushes the piston 76 by absorbing energy when the piston 76 is pushed in. In the embodiment, the rotating body 73 pushes the piston 76. The oil damper 70 reduces a speed of the rotating body 73 rotating in the intersecting direction Di. The stopper 77 stops the rotating body 73 by coming into contact with the rotating body 73 pushing the piston 76.

As illustrated in FIG. 8, one end of the arm 74 is rotatably coupled to the support portion 52, and the other end is rotatably coupled to the rotating body 73. The support portion 52, the arm 74, and the rotating body 73 constitute a link mechanism. The arm 74 converts movement of the support portion 52 in the uncoupling direction Do into movement of the rotating body 73 in the intersecting direction Di. The arm 74 converts movement of the support portion 52 in the coupling direction Dc into movement of the rotating body 73 in a direction opposite to the intersecting direction Di.

Figure 10:
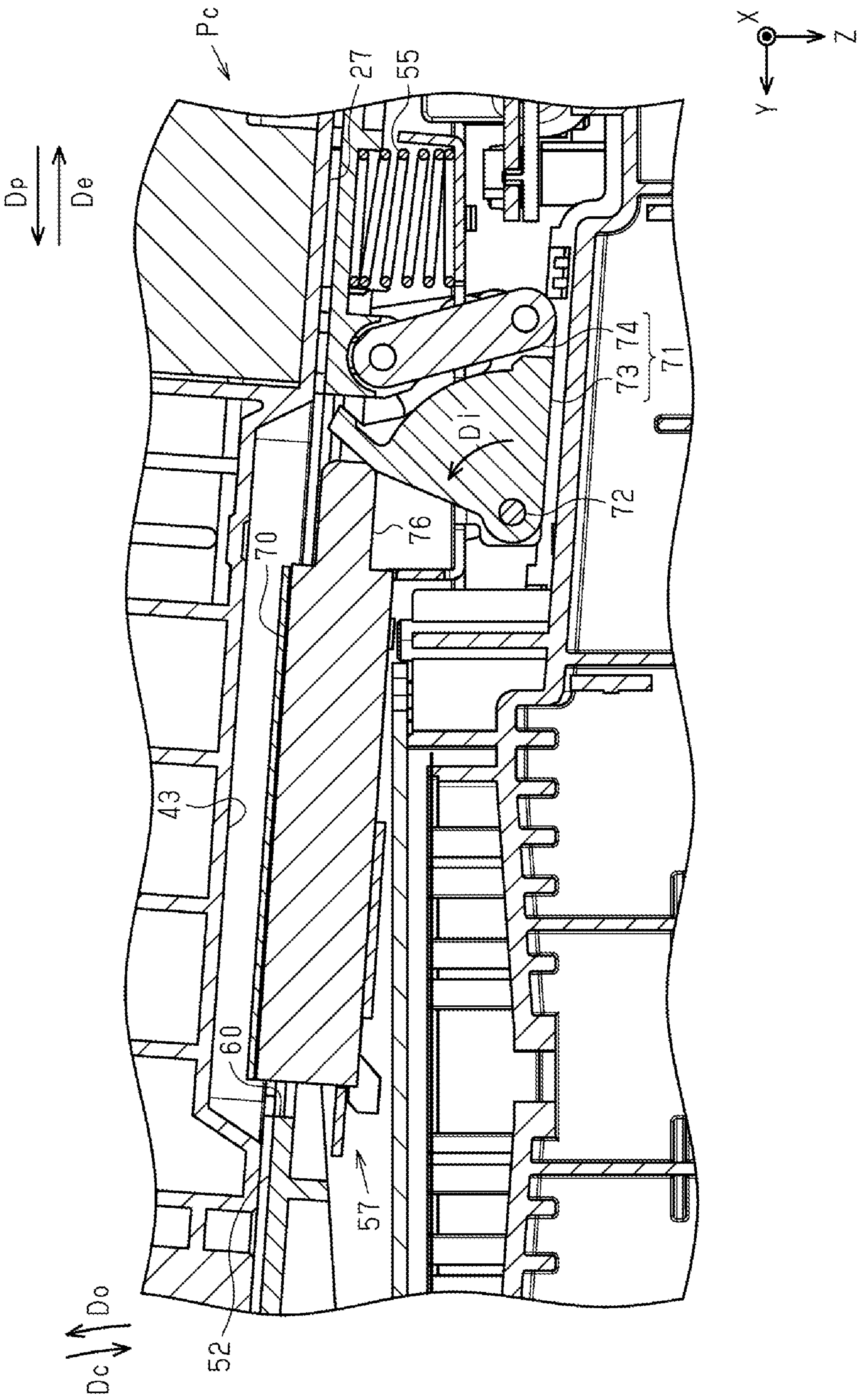
FIG. 10 is a partially enlarged view of the supply unit in FIG. 5.
Figure 11:
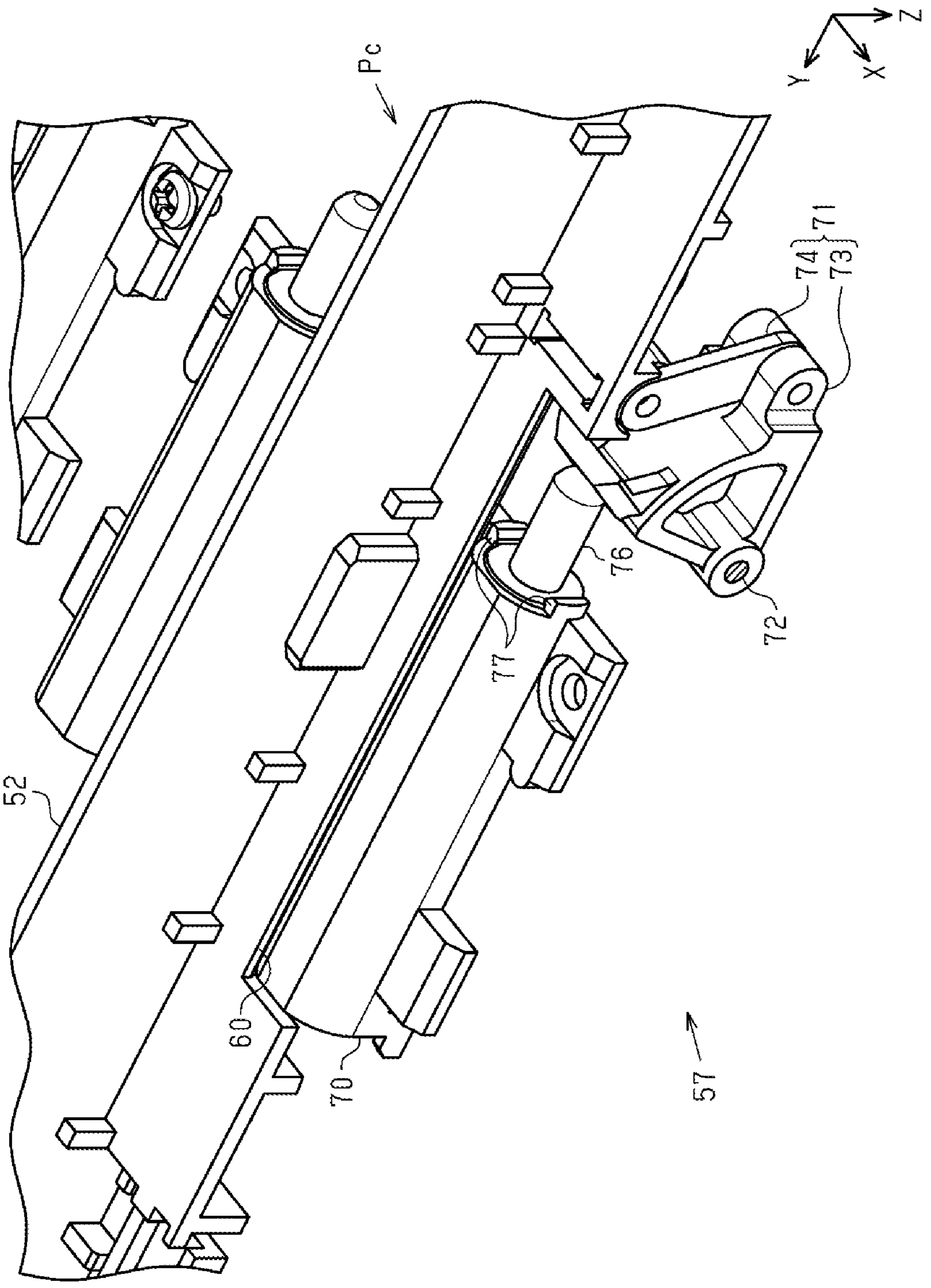
FIG. 11 is a perspective view of the speed reduction portion in FIG. 10.

As illustrated in FIGS. 10 and 11, when the rotating body 73 moves in the direction opposite to the intersecting direction Di, the piston 76 that has been pushed in is pushed out by a spring (not illustrated). A speed at which the spring included in the oil damper 70 pushes the piston 76 may be lower than a speed at which the support portion 52 pushed by the pressing member 55 moves the rotating body 73. The rotating body 73 may be separated from the piston 76 when it moves in the direction opposite to the intersecting direction Di.

The speed reduction portion 57 restricts rotation of the moving unit 71 when the liquid container 27 moves in the uncoupling direction Do. The speed reduction portion 57 permits rotation of the moving unit 71 when the liquid container 27 moves in the coupling direction Dc.

Operations of Embodiment

An operation when the liquid container 27 is mounted in the supply unit 21 will be described.

As illustrated in FIG. 4, the operator inserts the liquid container 27 through the insertion port 28 and pushes the liquid container 27 in the inserting direction Dp. A portion of the liquid container 27 pushed into the mounting portion 26 including its rear end in the inserting direction Dp may be located outside the insertion port 28.

Subsequently, the operator pushes down the liquid container 27. The operator may push a portion of the liquid container 27 located outside the insertion port 28 downward. Thus, the liquid container 27 moves in the coupling direction Dc together with the support portion 52. That is, the liquid container 27 and the support portion 52 move in the coupling direction Dc against the force with which the pressing member 55 presses the support portion 52.

As illustrated in FIGS. 5 and 7, the positioning protruding portion 53 enters the positioning hole 41 of the liquid container 27 moving in the coupling direction Dc. The coupling portion 42 is coupled to the liquid introducing portion 54. The coupling portion 42 may be coupled to the liquid introducing portion 54 in a state in which the positioning protruding portion 53 enters the positioning hole 41 to position the liquid container 27. The liquid container 27 that has moved to the coupling position Pc is restricted from moving in the uncoupling direction Do by the engaging portion 66 engaging with the engaged portion 39. While located at the coupling position Pc, the pressure receiving portion 34 receives the pressing force generated by the pressing member 55 in the uncoupling direction Do.

As illustrated in FIG. 8, when the support portion 52 moves in the coupling direction Dc, the rotating body 73 rotates in the direction opposite to the intersecting direction Di. The rotating body 73 moves to be separated from the oil damper 70 from the state illustrated in FIG. 8.

As illustrated in FIG. 10, when the rotating body 73 is separated from the oil damper 70, the piston 76 is pushed out. When the liquid container 27 and the support portion 52 are located at the coupling position Pc, at least a portion of the oil damper 70 may be located inside the receiving recessed portion 43.

Next, an operation when the liquid container 27 is removed from the supply unit 21 will be described.

As illustrated in FIG. 7, when the liquid container 27 is removed from the mounting portion 26, the operator operates the lever 68. Specifically, when the lever 68 is pushed down, the engaging portion 66 is disengaged from the engaged portion 39. When the engaging portion 66 is disengaged, the support portion 52 and the liquid container 27 which are pressed by the pressing member 55 move in the uncoupling direction Do.

As illustrated in FIG. 8, when the support portion 52 moves in the uncoupling direction Do, the rotating body 73 moves in the intersecting direction Di to push the piston 76 in. The speed reduction portion 57 reduces a moving speed of the rotating body 73 due to resistance of the oil damper 70. The speed reduction portion 57 reduces the moving speed of the liquid container 27 via the support portion 52.

As illustrated in FIG. 6, the liquid container 27 moves in the uncoupling direction Do, and thus the coupling portion 42 is separated from the liquid introducing portion 54. The positioning hole 41 is separated from the positioning protruding portion 53. In this case, the moving speed in the uncoupling direction Do is reduced by the speed reduction portion 57. For that reason, inertial forces applied to the liquid contained in the liquid container 27 and the liquid remaining in the coupling portion 42 are smaller than that when the speed is high. Accordingly, dripping of the liquid from the coupling portion 42 is reduced.

As illustrated in FIG. 4, when the liquid container 27 and the support portion 52 move to the guide position Pg, the liquid container 27 can move in the extracting direction De. The operator removes the liquid container 27 by pulling out the liquid container 27 in the extracting direction De.

Effects of Embodiment

Effects of the embodiment will be described.

(1) The speed reduction portion 57 reduces the moving speed of the liquid container 27 moving in the uncoupling direction Do. That is, since the speed reduction portion 57 reduces the moving speed of the liquid container 27 uncoupled from the liquid introducing portion 54, dripping of the liquid when the liquid container 27 is removed can be reduced.

(2) The speed reduction portion 57 reduces the moving speed of the liquid container 27 by reducing the moving speed of the support portion 52. Accordingly, as compared to a case in which the speed reduction portion 57 directly reduces the moving speed of the liquid container 27, it is possible to improve a degree of freedom in design.

(3) The speed reduction portion 57 reduces the moving speed of the liquid container 27 by reducing the moving speed of the moving unit 71 in the intersecting direction Di intersecting the uncoupling direction Do. Accordingly, it is possible to improve a degree of freedom in design.

(4) The moving unit 71 includes the rotating body 73 that rotates about the rotation shaft 72. For that reason, it is possible to design using a lever ratio, which is a ratio between a distance from a center of the rotation shaft 72 to a position on which the speed reduction portion 57 acts and a distance from the center of the rotation shaft 72 to a position to which the support portion 52 is coupled. Accordingly, it is possible to improve a degree of freedom in design.

(5) While the speed reduction portion 57 restricts the rotation of the moving unit 71 when the liquid container 27 moves in the uncoupling direction Do, it permits the rotation of the moving unit 71 when the liquid container 27 moves in the coupling direction Dc. Accordingly, when the liquid container 27 is mounted, it is possible to inhibit an increase in resistance of moving the liquid container 27 in the coupling direction Dc.

(6) Since the speed reduction portion 57 includes the oil damper 70, the moving speed can be easily reduced.

(7) The moving speed of the liquid container 27 during moving in the uncoupling direction Do is reduced by the speed reduction portion 57. That is, as for the liquid container 27, since the moving speed of the liquid container 27 uncoupled from the liquid introducing portion 54 is reduced, dripping of the liquid when the liquid container 27 is removed can be reduced.

MODIFIED EXAMPLES

The embodiment can be modified and implemented as follows. The embodiment and the following modified examples can be implemented in combination with each other within a range in which they are not technically impossible.

First Modified Example

Figure 12:
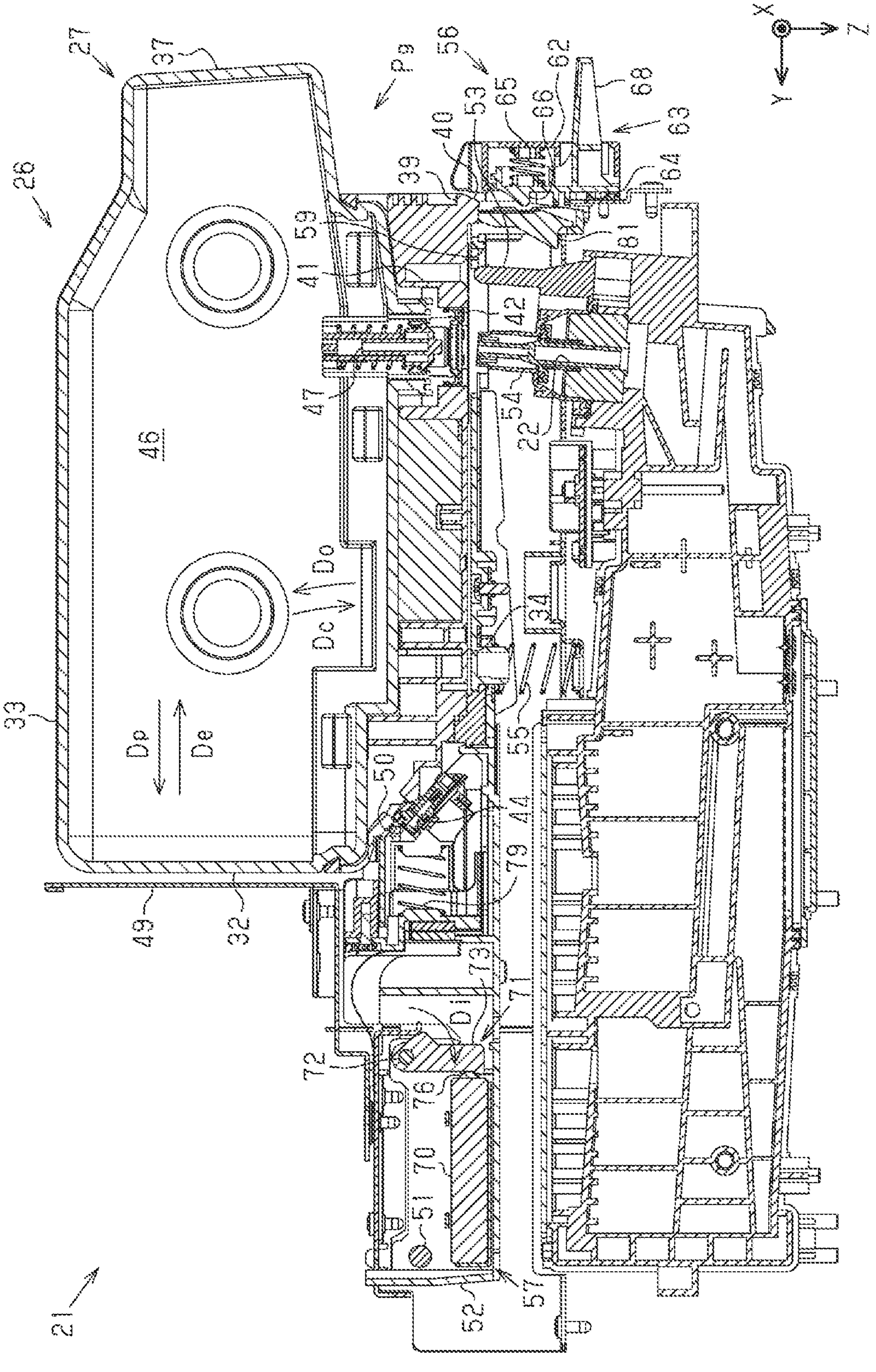
FIG. 12 is a cross-sectional view of supply units according to a first modified example to a third modified example.

As illustrated in FIG. 12, the speed reduction portion 57 may be provided deep in the mounting portion 26 in the inserting direction Dp. The liquid container 27 may be configured not to include the receiving recessed portion 43. The support portion 52 may be configured not to include the second hole 60. The moving unit 71 may be configured to include the rotating body 73 and not to include the arm 74.

The speed reduction portion 57 may be provided in the support portion 52. The speed reduction portion 57 may move together with the support portion 52 to the guide position Pg illustrated in FIG. 12 and the coupling position Pc illustrated in FIG. 13.

As illustrated in FIG. 12, in the speed reduction portion 57 located at the guide position Pg, the piston 76 is pushed in by the rotating body 73 being sandwiched between the frame 49 and the oil damper 70.

When the operator pushes down the liquid container 27, the liquid container 27, the support portion 52, and the speed reduction portion 57 move in the coupling direction Dc.

Figure 13:
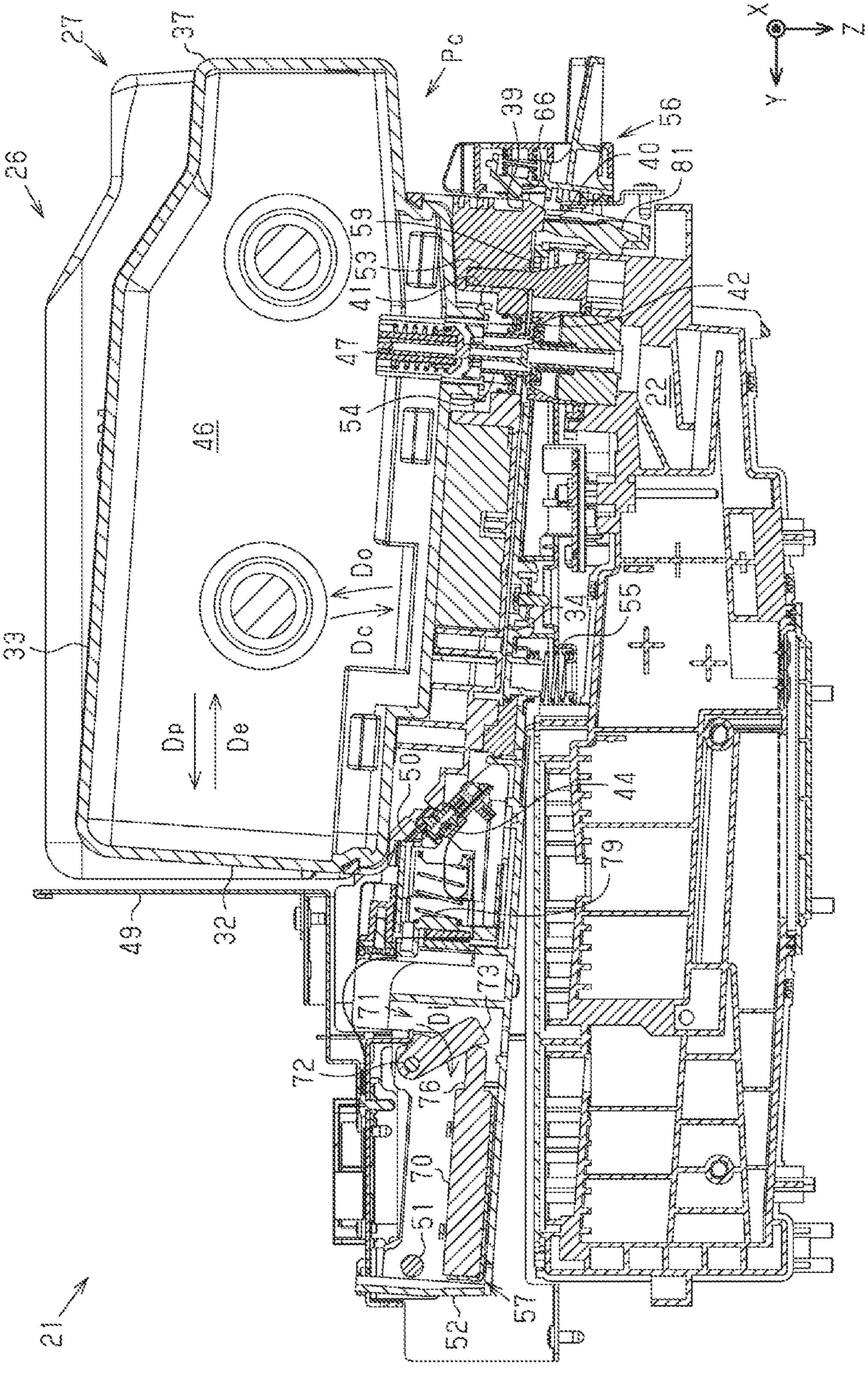
FIG. 13 is a cross-sectional view of the supply units according to the first modified example to the third modified example.

As illustrated in FIG. 13, the rotating body 73 moves relative to the frame 49, so that it can move in a direction separated from the oil damper 70. The oil damper 70 pushes out the piston 76 due to a spring (not illustrated).

When the liquid container 27, the support portion 52, and the speed reduction portion 57 move in the uncoupling direction Do, the rotating body 73 pushed by the frame 49 rotates in the intersecting direction Di and pushes the piston 76 in. The speed reduction portion 57 reduces the moving speed of the liquid container 27 when the liquid container 27 moves in the uncoupling direction Do by reducing the moving speed of the rotating body 73 due to the resistance of the oil damper 70.

Second Modified Example

As illustrated in FIGS. 12 and 13, the supply unit 21 may include a second spring 79. The second spring 79 may push the liquid container 27 mounted in the mounting portion 26 in the extracting direction De. The liquid container 27 that has moved from the coupling position Pc to the guide position Pg may move in the extracting direction De by being pressed by the second spring 79.

Third Modified Example

As illustrated in FIGS. 12 and 13, the supply unit 21 may include a lock portion 81 that restricts movement of the support portion 52. The lock portion 81 may allow movement of the support portion 52 by engaging with the release portion 40 of the liquid container 27 mounted in the mounting portion 26.

Other Modified Examples

The coupling portion 42 may be provided on the first end wall 32. The liquid introducing portion 54 may be provided deep in the mounting portion 26, that is, at a position separated from the insertion port 28 in the inserting direction Dp. The pressing member 55 may directly apply a pressing force to the liquid container 27. The pressing member 55 may press the first end wall 32, which is an example of the pressure receiving portion, in the extracting direction De. The speed reduction portion 57 may reduce the moving speed of the liquid container 27 during moving in the extracting direction De. In this case, the inserting direction Dp is an example of the coupling direction, and the extracting direction De is an example of the uncoupling direction. That is, the coupling direction Dc and the uncoupling direction Do may be parallel to the Y axis.

The supply unit 21 may not include the support portion 52. The pressing member 55 may directly press the liquid container 27.

The coupling direction Dc and the uncoupling direction Do may be directions parallel to the Z axis.

The speed reduction portion 57 may reduce the moving speed of the liquid container 27 during moving in both the coupling direction Dc and the uncoupling direction Do.

The speed reduction portion 57 may include an air damper instead of the oil damper 70.

The speed reduction portion 57 may be configured not to include the moving unit 71.

The speed reduction portion 57 may include a friction member. The friction member may generate a frictional force by coming into contact with at least one of the rotating body 73, the lever 68, the support portion 52, and the liquid container 27 that move in the uncoupling direction Do, for example. That is, the speed reduction portion 57 may reduce the moving speed of the liquid container 27 moving in the uncoupling direction Do using the frictional force.

The speed reduction portion 57 may include a deformable deformation member such as a sponge. The deformation member may be crushed by coming into contact with at least one of, for example, the rotating body 73, the lever 68, the support portion 52, and the liquid container 27 that move in the uncoupling direction Do. The speed reduction portion 57 may reduce the moving speed of the liquid container 27 moving in the uncoupling direction Do by deforming the deformation member.

The speed reduction portion 57 may include a damper that applies a load to rotation of at least one of the first shaft 51 and the rotation shaft 72. When the liquid container 27 moves in the uncoupling direction Do, the speed reduction portion 57 may reduce the moving speed of the liquid container 27 by applying the load to the rotation of at least one of the first shaft 51 and the rotation shaft 72.

The oil damper 70 may push the rotating body 73 moving in the direction opposite to the intersecting direction Di.

The pressing member 55 may be configured of, for example, a coil spring, a plate spring, a disc spring, rubber, an air spring, or the like.

The pressing member 55 may press the liquid container 27 in the uncoupling direction Do by pulling the support portion 52 in the uncoupling direction Do. In this case, the pressing member 55 may be configured of a tension spring, a spiral spring, rubber, a well bucket with a weight, or the like.

The liquid discharge device 11 may be a liquid discharge device that sprays or discharges a liquid other than ink. A state of the liquid discharged from the liquid discharge device in a form of a minute amount of droplet is also assumed to include a state in which it has a tail in a particulate form, a teardrop form, or a thread-like form. The liquid referred to here may be any material as long as it can be discharged from the liquid discharge device. For example, the liquid may be any substance in a state of a liquid phase and is assumed to include fluids such as high or low viscosity liquids, sols, gel water, other inorganic solvents, organic solvents, solutions, liquid resins, liquid metals, and metal melts. The liquid not only includes liquid as one state of substance, but also includes a solution, a dispersion, or a mixture of particles of a functional material made of solid matter such as pigments and metal particles dissolved in a solvent. Typical examples of the liquid include ink and liquid crystal as described in the above embodiment. Here, the ink is assumed to include general water-based ink, oil-based ink, and various liquid compositions such as gel ink and hot-melt ink. Specific examples of the liquid discharge device include devices that discharge liquids containing materials such as electrode materials and coloring materials in a dispersed or dissolved form, which are used for manufacturing liquid crystal displays, electroluminescence displays, surface emitting displays, color filters, and the like. The liquid discharge device may be a device that discharges bioorganic substances used for manufacturing biochips, a device that is used for precision pipettes and discharges liquids serving as samples, a textile printing device, a micro-dispenser, or the like. The liquid discharge device may be a device that discharges lubricating oil in a pinpoint manner to precision instruments such as watches and cameras, or a device that discharges a transparent resin liquid such as an ultraviolet curable resin onto a substrate in order to form micro-hemispherical lenses, optical lenses, or the like used for optical communication devices, and the like. The liquid discharge device may be a device that discharges an etching liquid such as an acid or an alkali for etching a substrate or the like.

Definitions

The expression "at least one" as used in the specification means "one or more" of a desired option. As an example, the expression "at least one" as used in the specification means "only one option" or "both of two options" if the number of options is two. As another example, the expression "at least one" as used in the specification means "only one option" or "any combination of two or more options" if the number of options is three or more.

Supplementary Description

Technical ideas and operational effects obtained from the above-described embodiment and modified examples will be described below.

(A) The supply unit is a supply unit in which a liquid container including a coupling portion is detachably mounted, and includes a liquid introducing portion to which the coupling portion of the liquid container is coupled, a pressing member that presses the liquid container in an uncoupling direction, which is a direction opposite to a coupling direction, when a direction in which the liquid container is coupled to the liquid introducing portion is defined as the coupling direction, an engaging portion that engages with the liquid container when the liquid container is coupled to the liquid introducing portion, and a speed reduction portion that reduces, when engagement of the engaging portion with the liquid container is released, a moving speed of the liquid container moving in the uncoupling direction.

According to this configuration, the speed reduction portion reduces the moving speed of the liquid container moving in the uncoupling direction. That is, since the speed reduction portion reduces the moving speed of the liquid container uncoupled from the liquid introducing portion, dripping of the liquid when the liquid container is removed can be reduced.

(B) The supply unit may further include a support portion that supports the liquid container, the pressing member may press the liquid container via the support portion, and the speed reduction portion may reduce the moving speed of the liquid container by reducing the moving speed of the support portion.

According to this configuration, the speed reduction portion reduces the moving speed of the liquid container by reducing the moving speed of the support portion. Accordingly, it is possible to improve a degree of freedom in design as compared to a case in which the speed reduction portion directly reduces the moving speed of the liquid container.

(C) The supply unit may include a moving unit, at least a part of the moving unit is movable in an intersecting direction intersecting the uncoupling direction in response to movement of the support portion in the uncoupling direction, and the speed reduction portion may reduce the moving speed of the liquid container by reducing a moving speed of the moving unit in the intersecting direction.

According to this configuration, the speed reduction portion reduces the moving speed of the liquid container by reducing the moving speed of the moving unit in the intersecting direction intersecting the uncoupling direction. Accordingly, it is possible to improve a degree of freedom in design.

(D) In the supply unit, the moving unit may include a rotating body that rotates about a rotation shaft extending in a direction intersecting the uncoupling direction and the intersecting direction.

According to this configuration, the moving unit includes the rotating body that rotates about the rotation shaft. For that reason, it is possible to design using a lever ratio, which is a ratio of a distance from a center of the rotation shaft to a position affected by an action of the speed reduction portion to a distance from the center of the rotation shaft to a position to which the support portion is coupled. Accordingly, it is possible to improve a degree of freedom in design.

(E) In the supply unit, the speed reduction portion may restrict rotation of the moving unit when the liquid container moves in the uncoupling direction and may permit rotation of the moving unit when the liquid container moves in the coupling direction.

According to this configuration, while the speed reduction portion restricts the rotation of the moving unit when the liquid container moves in the uncoupling direction, it does not restrict the rotation of the moving unit when the liquid container moves in the coupling direction. Accordingly, when the liquid container is mounted, it is possible to inhibit an increase in resistance of moving the liquid container in the coupling direction.

(F) In the supply unit, the speed reduction portion may include an oil damper.

According to this configuration, since the speed reduction portion includes the oil damper, it is possible to easily reduce the moving speed.

(G) A liquid discharge device includes a liquid discharge head that discharges a liquid, a supply flow path through which the liquid contained in a liquid container is supplied to the liquid discharge head, and the supply unit having the above configurations. According to this configuration, the same effects as those of the supply unit can be obtained.

(H) The liquid container is a liquid container detachably mounted in a supply unit, the supply unit including a liquid introducing portion capable of introducing a liquid, a pressing member capable of generating a pressing force, an engaging portion, and a speed reduction portion, and includes a coupling portion that is coupled to the liquid introducing portion, a pressure receiving portion that receives the pressing force from the pressing member in an uncoupling direction, which is a direction opposite to a coupling direction, when a direction in which the liquid container is coupled to the liquid introducing portion is defined as the coupling direction, an engaged portion with which the engaging portion engages when the liquid container is coupled to the liquid introducing portion, and a receiving recessed portion that stores at least a part of the speed reduction portion, the speed reduction portion being configured to reduce a moving speed of the liquid container moving in the uncoupling direction.

According to this configuration, the moving speed of the liquid container when moving in the uncoupling direction is reduced by the speed reduction portion. That is, as for the liquid container, since the moving speed of the liquid container uncoupled from the liquid introducing portion is reduced, dripping of the liquid when the liquid container is removed can be reduced.

What is claimed is:

1. A supply unit in which a liquid container including a coupling portion is detachably mounted, the supply unit comprising:

a liquid introducing portion to which the coupling portion of the liquid container is coupled;

a pressing member configured to press the liquid container in an uncoupling direction being a direction opposite to a coupling direction when a direction in which the liquid container is coupled to the liquid introducing portion is defined as the coupling direction;

an engaging portion configured to engage with the liquid container when the liquid container is coupled to the liquid introducing portion; and a speed reduction portion configured to reduce, when engagement of the engaging portion with the liquid container is released, a moving speed of the liquid container moving in the uncoupling direction.

2. The supply unit according to claim 1, further comprising a support portion configured to support the liquid container, wherein the pressing member presses the liquid container via the support portion and the speed reduction portion reduces the moving speed of the liquid container by reducing a moving speed of the support portion.

3. The supply unit according to claim 2, further comprising a moving unit, wherein at least a part of the moving unit is configured to move in an intersecting direction intersecting the uncoupling direction in response to movement of the support portion in the uncoupling direction, and the speed reduction portion reduces the moving speed of the liquid container by reducing a moving speed of the moving unit in the intersecting direction.

4. The supply unit according to claim 3, wherein the moving unit includes a rotating body configured to rotate about a rotation shaft extending in a direction intersecting the uncoupling direction and the intersecting direction.

5. The supply unit according to claim 4, wherein the speed reduction portion restricts rotation of the moving unit when the liquid container moves in the uncoupling direction, and does not restrict the rotation of the moving unit when the liquid container moves in the coupling direction.

6. The supply unit according to claim 1, wherein the speed reduction portion includes an oil damper.

7. A liquid discharge device comprising:

a liquid discharge head configured to discharge a liquid;

a supply flow path through which the liquid contained in a liquid container is supplied to the liquid discharge head; and the supply unit according to claim 6.

8. A liquid container detachably mounted in a supply unit, the supply unit including a liquid introducing portion configured to introduce a liquid, a pressing member configured to generate a pressing force, an engaging portion, and a speed reduction portion, the liquid container comprising:

a coupling portion configured to be coupled to the liquid introducing portion;

a pressure receiving portion configured to receive the pressing force from the pressing member in an uncoupling direction being a direction opposite to a coupling direction when a direction in which the liquid container is coupled to the liquid introducing portion is defined as the coupling direction;

an engaged portion with which the engaging portion engages when the liquid container is coupled to the liquid introducing portion; and a receiving recessed portion configured to store at least a part of the speed reduction portion, the speed reduction portion being configured to reduce a moving speed of the liquid container moving in the uncoupling direction.

* * * * *